United States Patent
Varma

(10) Patent No.: US 9,173,158 B2
(45) Date of Patent: Oct. 27, 2015

(54) METHOD AND APPARATUS FOR IMPROVING LTE ENHANCED PACKET CORE ARCHITECTURE USING OPENFLOW NETWORK CONTROLLER

(71) Applicant: Tellabs Operations, Inc., Naperville, IL (US)

(72) Inventor: Subir Varma, San Jose, CA (US)

(73) Assignee: Tellabs Operations, Inc., Naperville, IL (US)

( * ) Notice: Subject to any disclaimer, the term of this patent is extended or adjusted under 35 U.S.C. 154(b) by 167 days.

(21) Appl. No.: 13/791,539

(22) Filed: Mar. 8, 2013

(65) Prior Publication Data

US 2014/0254373 A1    Sep. 11, 2014

(51) Int. Cl.
*H04W 40/36* (2009.01)
*H04W 92/02* (2009.01)

(52) U.S. Cl.
CPC .............. *H04W 40/36* (2013.01); *H04W 92/02* (2013.01)

(58) Field of Classification Search
None
See application file for complete search history.

(56) References Cited

U.S. PATENT DOCUMENTS

| | | | | |
|---|---|---|---|---|
| 6,611,499 | B1* | 8/2003 | D'Souza | 370/252 |
| 6,636,502 | B1* | 10/2003 | Lager et al. | 370/352 |
| 6,791,957 | B2* | 9/2004 | Kim | 370/331 |
| 7,197,019 | B2* | 3/2007 | Menzel et al. | 370/331 |
| 7,367,052 | B1* | 4/2008 | Desanti | 726/3 |
| 7,418,273 | B2* | 8/2008 | Tomoe et al. | 455/561 |
| 8,134,987 | B2* | 3/2012 | Verma et al. | 370/338 |
| 8,279,835 | B2* | 10/2012 | Sun et al. | 370/331 |
| 8,374,081 | B2* | 2/2013 | Farrugia et al. | 370/229 |
| 8,503,361 | B2* | 8/2013 | Bienas et al. | 370/328 |
| 8,509,091 | B2* | 8/2013 | Tan et al. | 370/241 |
| 8,542,590 | B2* | 9/2013 | Lopez et al. | 370/232 |
| 8,605,655 | B1* | 12/2013 | Sahai et al. | 370/328 |
| 8,626,157 | B2* | 1/2014 | Nas et al. | 455/432.3 |
| 8,824,485 | B2* | 9/2014 | Biswas et al. | 370/395.53 |
| 2003/0079005 | A1* | 4/2003 | Myers et al. | 709/223 |
| 2006/0057978 | A1* | 3/2006 | Love et al. | 455/127.1 |
| 2006/0098669 | A1* | 5/2006 | Enns et al. | 370/401 |
| 2007/0019559 | A1* | 1/2007 | Pittelli et al. | 370/248 |
| 2008/0144502 | A1* | 6/2008 | Jackowski et al. | 370/235 |
| 2009/0003242 | A1* | 1/2009 | Tinnakornsrisuphap et al. | 370/255 |
| 2012/0166618 | A1* | 6/2012 | Dahod et al. | 709/224 |
| 2012/0218970 | A1* | 8/2012 | Westberg et al. | 370/331 |
| 2012/0289246 | A1* | 11/2012 | Huber et al. | 455/456.1 |

(Continued)

FOREIGN PATENT DOCUMENTS

WO    WO2012029422    *   3/2012

*Primary Examiner* — Hassan Kizou
*Assistant Examiner* — Tejis Daya
(74) *Attorney, Agent, or Firm* — James M. Wu; JW Law Group

(57) ABSTRACT

A communication network configured to substitute serving gateway ("SGW"), packet data network gateway ("PGW"), and mobility management entity ("MME") with an OpenFlow network controller ("OFNC") for packets routing between mobile devices and the Internet is disclosed. The network includes a cellular base station, a packet data network ("PDN"), and OFNC. The cellular base station provides wireless communication for user equipments ("UEs"). The PDN is able to route packet flows to their destination(s). The routing controller or OFNC manages a cluster of routers including at least one edge router via OpenFlow protocol. The OFNC, in one embodiment, establishes a routing path between the cellular base station and the PDN for an authenticated UE via a group of routers based on information obtained from an authenticating server and a charging system.

20 Claims, 15 Drawing Sheets

(56) References Cited

U.S. PATENT DOCUMENTS

| | | | |
|---|---|---|---|
| 2013/0145002 A1* | 6/2013 | Kannan et al. | 709/223 |
| 2013/0148537 A1* | 6/2013 | Uchida | 370/252 |
| 2013/0163424 A1* | 6/2013 | Goerke et al. | 370/235 |
| 2013/0343295 A1* | 12/2013 | Deo | 370/329 |
| 2014/0204746 A1* | 7/2014 | Sun et al. | 370/235 |

* cited by examiner

FIG. 3 Network Entry

FIG. 4 Handover

FIG. 5 Handover

FIG 6 Idle Procedure

FIG 7 UE Triggered

FIG 8 Network Triggered

FIG 10 WLAN

FIG 11 WLAN

FIG 12 Virtualization

FIG 13 CDN

METHOD AND APPARATUS FOR IMPROVING LTE ENHANCED PACKET CORE ARCHITECTURE USING OPENFLOW NETWORK CONTROLLER

FIELD

The exemplary embodiment(s) of the present invention relates to communications network. More specifically, the exemplary embodiment(s) of the present invention relates to simplifying network devices and gateways in a packet core network.

BACKGROUND

With rapid growth of mobile data transfer over a high-speed communication network such as 3G or 4G cellular services, managing and routing such data transfer efficiently become increasingly difficult. A conventional network layout, for example, typically includes various networks, such as Internet, packet data network ("PDN"), local area network ("LAN"), wireless local area network ("WLAN"), and cellular radio network. A conventional mobile or wireless network may include $3^{rd}$ Generation Universal Mobile Telecommunications System ("3G UMTS"), long term evolution ("LTE"), 3rd Generation Partnership Project 2 ("3GPP2") and/or Worldwide Interoperability for Microwave Access ("WiMAX"). It should be noted that a typical network could include hundreds of network devices, such as access switches, routers, and bridges, used for data delivery from source devices to destination devices.

A conventional LTE enhanced packet core ("EPC") architecture generally deploys specialized nodes such as serving gateways ("SGWs"), packet data network gateways ("PGWs"), and mobility management entity ("MME") for handling user authorization, packets routing, and usage between cellular network(s) and PDN(s). A problem, however, associated with using SGWs, PGWs, and MME is that they are more complex and expensive than typical Ethernet based network devices such as routers and/or Internet Protocol ("IP") switches.

Another drawback associated with using SGW, PGW, and/or MME is that such device typically consumes additional bandwidth because of packet tunneling. For example, implementing packet tunneling generally requires additional overhead as well as bandwidth. As such, support of mobility and/or QoS in a conventional LTE EPC architecture can be complicated and expensive.

Another shortcoming associated with employing SGW, PGW, and/or MME is that in order for SGW, PGW, and MME to operate, a set of complex protocols is used to facilitate communications between SGW, PGW, and MME, QoS, and inter-operability. It should be noted that in a packet core network ("PCN"), operators generally have limited influence over control functions thereby introducing value added features to a network can be difficult.

SUMMARY

An exemplary embodiment of present invention discloses a communications network that uses an OpenFlow network controller ("OFNC") to perform at least a portion of functionalities traditionally performed by SGW, PGW, and/or MME. The communications network, in one aspect, includes one or more cellular base stations, PDN, and OFNC. The cellular base station provides wireless communication for user equipments ("UEs") and a backhaul. PDN routes packet flows from their source(s) to destination(s) across one or more networks. OFNC or routing controller manages a cluster of routers in the backhaul which includes at least one edge router using messages formatted in OpenFlow protocol. For example, OFNC is able to assist in establishing a routing path between the cellular base station and the PDN for UE network services. Note that OFNC may select routing path(s) based on network subscriptions and/or status, such as authentication, authorization, accounting, policy, and/or network congestions.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
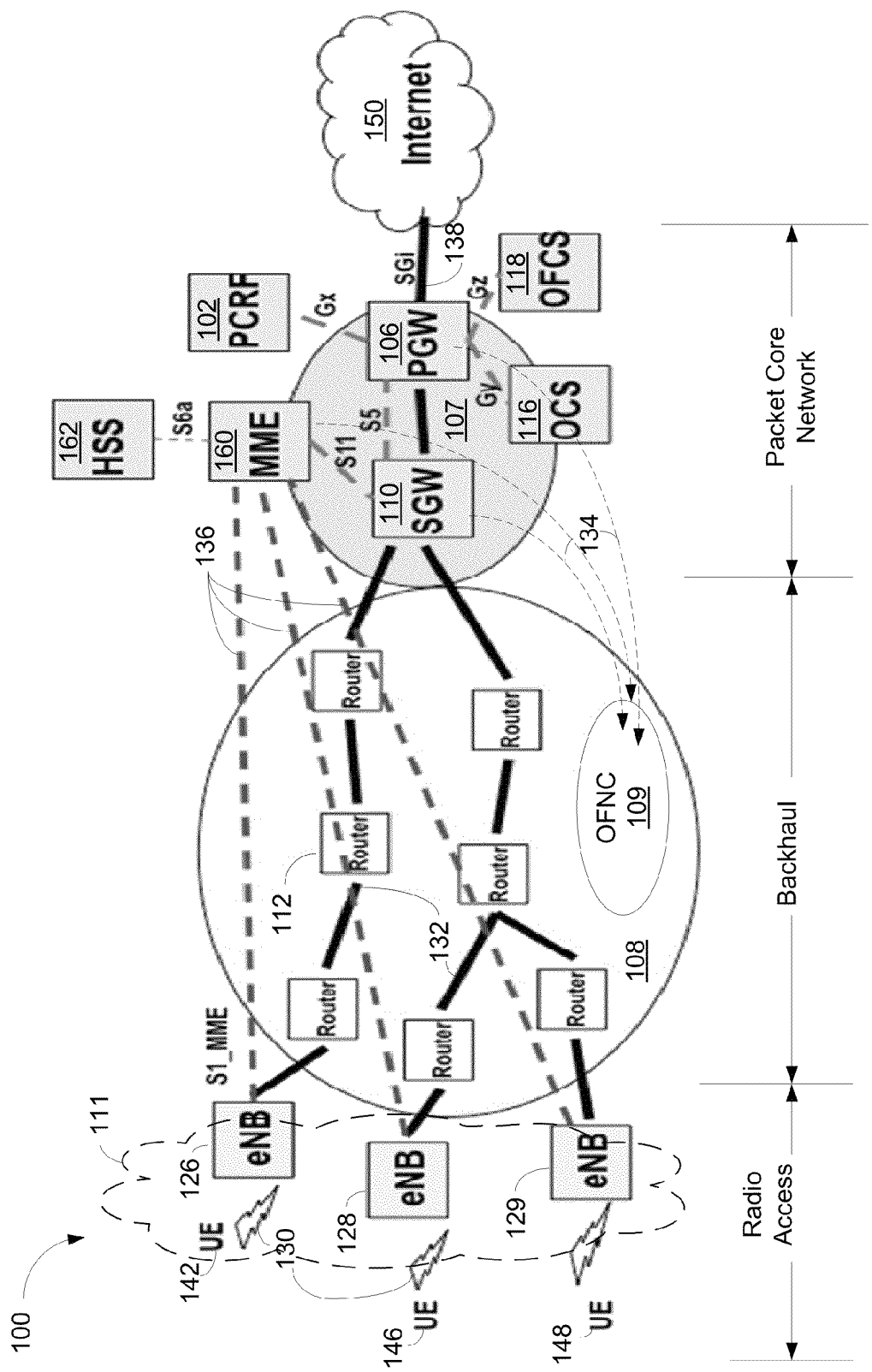
FIGS. 1A-B are block diagrams illustrating network configurations able to route traffic flows between radio network and Internet using a backhaul and packet core network ("PCN") in accordance with one embodiment of the present invention.

Exemplary embodiment(s) of the present invention is described herein in the context of a method, device, and apparatus of employing an OpenFlow network controller ("OFNC") which is used to substitute network gateways and mobility management entity ("MME") for traffic routing between radio network and packet data network ("PDN").

Those of ordinary skills in the art will realize that the following detailed description of the exemplary embodiment(s) is illustrative only and is not intended to be in any way limiting. Other embodiments will readily suggest themselves to such skilled persons having the benefit of this disclosure.

Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Information pertaining to the transfer of packet(s) through a network is embedded within the packet itself. Each packet traveling through one or more communications networks such as Internet and/or Ethernet can be handled independently from other packets in a packet stream or traffic. For example, each router, which may include routing, switching, and/or bridging engines, processes incoming packets and determines where the packet(s) should be forwarded.

In a packet switching network, a packet flow, which can also be referred to as packet stream, traffic flow, packet flow, flow, data stream, and/or network flow, includes multiple packets having heads and payloads configured to carry certain types of information such as data, voice, or video capable of traveling from a source node to a destination node. In one example, a packet flow refers to a packet or a sequence of packets.

One embodiment of the present invention discloses a communications network configuration capable of substituting at least a portion of the functionalities performed by SGW, PGW, and/or MME with functions in OFNC for packets routing. The network includes a cellular base station, PDN, and OFNC. The cellular base station provides wireless communication for user equipments ("UEs"). The PDN, which can be the Internet, is able to route packet flows to their destination(s). The routing controller or OFNC manages a cluster of routers in a backhaul network including at least one edge router via messages coded in OpenFlow protocol. The OFNC, in one embodiment, is able to assist in establishing a routing path between the cellular base station and the PDN for UE network service in response to information relating to authentication, authorization, charging policy, and/or network status.

FIG. 1A is a block diagram 100 illustrating a network configuration capable of routing traffic flows between a radio network and the Internet (or PDN) using a backhaul and packet core network ("PCN") in accordance with one embodiment of the present invention. Diagram 100 includes a cellular radio access network ("CRAN") 111, backhaul 108, PCN 107, and Internet 150. CRAN 111 is able to provide network services to UEs 142-148 via wireless radio signals. It should be noted that the underlying concept of the exemplary embodiment(s) of the present invention would not change if one or more blocks (or devices) were added to or removed from diagram 100.

CRAN 111, which, for example, can also be referred to as long term evolution ("LTE") network, is a cellular communications network which uses wireless or cellular information technology such as GSM and/or UMTS protocols/standards. CRAN 111 capable of coupling to MME 160 includes cell sites and/or radio towers 126-129 which are also known as base stations, node Bs, and/or eNodeBs ("eNBs"). A function of CRAN 111 is to facilitate network communication between mobile devices across, for instance, several sub, local, or global networks. It should be noted that CRAN or LTE 111 may include additional radio towers as well as other land switching circuitry. Note that the terms "eNB," "cell site," "radio tower," "base station," and/or "node B" can be herein referred to the same or similar apparatus and thus they can be used interchangeably. Each eNB such as eNB 126, for example, is able to handle a group of UEs such as UEs 142 within its cellular cell or coverage.

UE 142, in one example, may be a wireless portable device, such as a cellular phone, handheld device, tablet, iPad®, smart phone, iPhone®, BlackBerry®, Samsung Galaxy®, Android®, and is able to communicate with eNB 126 via wireless connections 130. It should be noted that UE 142 can also be other stationary or mobile wireless capable devices, such as laptop computers, wireless capable medical devices, wireless capable automobile devices, power stations, and/or any digital processing devices. UE 142 can be a single or a cluster of devices.

Backhaul 108, also known as backhaul network, includes multiple network devices, such as routers 112, hubs, switches, bridges, and servers, and routes network traffic or packet flows between networks such as LTE 111 and Internet 150. Backhaul 108 includes boundary switches (or routers), interior (or intermediary) switches, and edge routers. In one aspect, eNB boundary switch indicates a switch located at edge of backhaul 108 and coupled to an eNB. An edge router indicates a switch located at the edge of backhaul 108 and is coupled to a PDN (or Internet). Intermediate connections or links 132 between switches (or routers) are used to connect switches so that backhaul 108 is able to transfer packet flows to core networks, internal routers, and subnetworks via switches, routers, edge routers and/or boundary switches in backhaul 108. For example, backhaul 108 provides network communication between CRAN 111 and PCN 107.

PCN 107 includes a packet data network gateway ("PGW) 106, mobility management entity ("MME") 160, serving gateway ("SGW") 110. SGW 110 is coupled to MME 160 using S11 protocol link and coupled to PGW 106 using S5 protocol link. PCN 107, in one example, is a packet switching communications network that uses packets to transfer information between a source and a destination. Multiple packets may be independently transmitted to their destination and the sequence of packets can be reassembled or reordered to its original order of packets when they reach to their destination. Home subscriber server ("HSS") 162 coupled to MME 160 is a database containing subscriptions and authentication information.

MME 160 provides process for tracking idle mode UE and paging procedure including retransmissions. MME 160 facilitates bearer activation/deactivation process and suggests or elects SGW for a UE during an initial attachment as well as handover procedure. MME 160 is further coupled to HSS 162 and accesses information in HSS 162 to authenticate UE or user for initial attachment or handover.

HSS 162 is able to manage and verify user subscription based on stored information. Upon authenticating user's identity, a session(s) in accordance with user's subscription is established. While authentication verifies the identity of UE, authorization grants accessibility of the network such as WLAN to the UE. The accounting, on the other hand, records the usage of the network by the UE.

P-GW 106, which is also known as Home Agent, is used to provide network communication between UE such as UE 146 and content provider (or destination) via one or more networks such as radio access network 111 and Internet 150. PGW 106 uses an authentication, authorization, and accounting ("AAA") interface to communicate with policy and charging rules function ("PCRF") 102 via Gx control message, online charging server ("OCS") 116 via Gy control message, and offline charging system ("OFCS") 118 via Gz control message. Note that the functions of PGW 106 include, but not limited to, device connectivity, packet filtering, inspection, data usage, billing, or PCRF (policy and charging rules function) enforcement, et cetera. P-GW 106 may also include billing module, subscribing module, deep packet inspection ("DPI"), and/or tracking module to route traffic flows between source(s) and destination(s).

SGW 110, in one example, is coupled to MME 160 and cellular network or LTE 111, and is able to transfer data packets or packet flows between eNBs 126-129, MME 160, and PGW 106. Note that SGW 110 may be coupled to other network elements such as additional MMEs and/or base stations. SGW 110 can also be configured to perform network management functions, such as terminating paths, paging idle UEs, storing data, routing information, generating replica, and the like.

OFNC 109, in one embodiment, resides in backhaul 108 running on top of network operation system, is a routing controller configured to perform and/or substitute at least some of the functionalities performed by MME, SGW, and PGW using OpenFlow messages as well as software defined networking concepts. For example, various functions performed by MME 160, SGW 110, and PGW 106 are moved to OFNC 109 as indicated by arrows 134. Deploying OFNC 109 in backhaul 108 alters traditional LTE EPC architecture because at least a portion of the functions previously performed by PCN 107 is moved into backhaul 108 while preserving interfaces between UEs 142-148 and/or eNBs 126-129. In an alternative embodiment, OFNC 109 is used to perform at least a portion of functions originally performed by MME 160, SGW 110, and/or PGW 106 to enhance routing efficiency.

An advantage of using OFNC 109 is that allows a network operator to build a modified LTE EPC network using OpenFlow capable switches and/or routers to substitute gateways and MMEs. Note that OpenFlow capable switches or routers are generally less sophisticated and cost less than specialized SGWs and PGWs.

Another advantage of using OFNC 109 is that it conserves bandwidth and/or overhead because OFNC generally does not use tunneling for internal packets routing. Another advantage of using OFNC 109 is that it offers a new design for supporting mobility in which packet flows are rerouted in response to UE movement. It should be noted that the rerouting can happen anywhere within backhaul 108. Depending on the applications, backhaul network can be configured to provide more efficient routing paths than traditional routing via SGW and/or PGW. Note that using OFNC simplifies mobility design because OFNC is capable of providing flexibility in identifying less congested and/or shortest routing path to route packet flows.

Figure 1B:
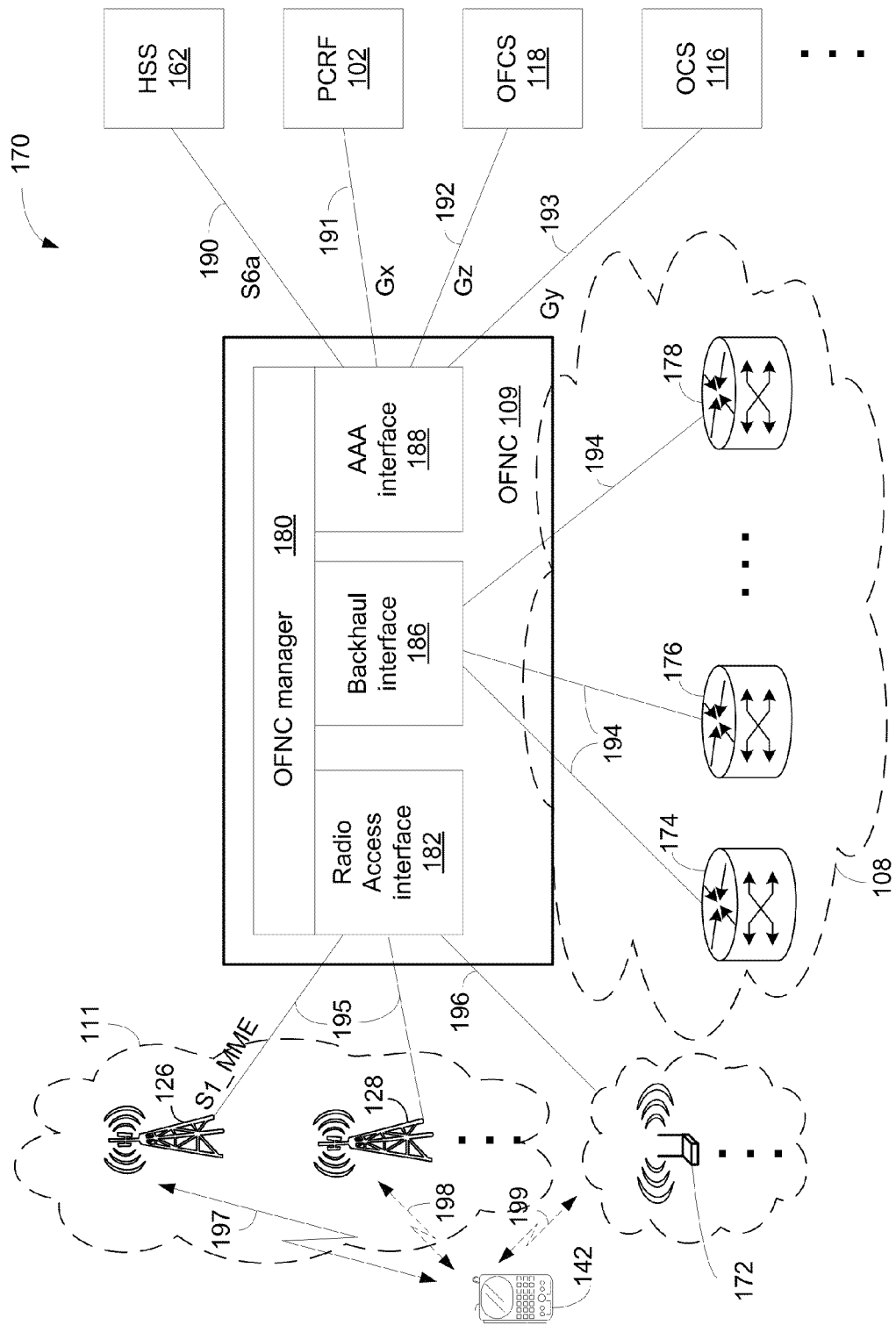

FIG. 1B is a block diagram 170 illustrating an exemplary network using OFNC to replace gateways and MME in accordance with one embodiment of the present invention. Diagram 170 includes OFNC 109, backhaul 108, radio access network 111, wireless local area network ("WLAN") 172, HSS 162, PCRF 102, OFCS 118, and OCS 116. Note that additional AAA (authentication, authorization, and accounting) devices or servers coupling to OFNC 109 may be added. It should be noted that the underlying concept of the exemplary embodiment(s) of the present invention would not change if one or more blocks (or devices) were added to or removed from diagram 170.

OFNC 109 includes an OFNC manager 180, radio access interface 182, backhaul interface 186, and AAA interface 188. OFNC 109, in one embodiment, uses OpenFlow communication protocol to perform certain functions traditionally performed by SGW, PGW, and/or MME whereby OFNC can be configured to replace some network devices, such as SGW, PGW, and/or MME. A benefit of using OFNC 109 is that overall network configuration may be simplified since some network devices such as PGW and/or MME may be eliminated.

OpenFlow is considered as a Layer 2 communications protocol that is able to access forwarding plane of a network router, hub, bridge, and/or switch. OpenFlow is also known as software-defined networking ("SDN") controller capable of routing network packets through various routers and/or switches. An advantage of employing OpenFlow is that it is capable of establishing additional routing paths and adding switching protocols in a backhaul network.

OPNC 109 can be a hardware component, a software module, and/or a combination of hardware and software component(s). An OpenFlow server, router, hub, or switch, residing in a network such as backhaul 108, operates over a network operating system. OpenFlow switch capable of operating as OPNC 109, for example, may reside in boundary router 174, interior router 176, edge router 178, or a combination of routers 174-178. OpenFlow switch, in one aspect, is able to separate a control path from a data path whereby high-level routing decisions can be forwarded to OPNC 109 which subsequently selects a more desirable routing path based on a set of predefined rules. OFNC manager 180, which can also be referred to as control or application control, is configured to manage OpenFlow interfaces (or ports) 182-188, OpenFlow tables, OpenFlow channels, not shown in FIG. 1B. OPNC 109 uses messages formatted in OpenFlow protocol to communicate with other network devices and/or routers. Exemplary OpenFlow messages include, but not limited to, packet-received, send-packet-out, modify-forwarding-table, get-stats, and the like.

In operation, each entry of OpenFlow table contains a set of packet fields and an action (such as send-out-port, modify-field, or drop) associated with one or more of packet fields. Upon receiving a packet that has no matching entry at OpenFlow table, OpenFlow sends related information and the packet to OFNC manager 180. OFNC manager 180 subsequently decides how to handle this newly arrived packet. The decision includes dropping the packet or adding a new entry in OpenFlow table.

Radio access interface 182, in one embodiment, is configured to handle multiple different types of EPC protocols. For instance, interface 182 can be configured to communicate with eNBs and WLAN directly without use of typical PCN devices, such as SGW, PGW, and MME. Radio access interface 182, for example, is able to communicate with eNBs 126-128 and WLAN 172 via messages formatted in S1_MME protocol 195 and/or messages formatted in OpenFlow protocol 196. During a handover process, radio access interface 182 is able to track smart phone 142 moving one base station to another base station, such as moving from eNB 126 to eNB 128 via wireless connections 197-198. When smart phone 142 or UE switches from LTE 111 to WLAN 172, radio access interface 182 is able to terminate old LTE connections and continue network service via WLAN 172.

Backhaul interface 186, in one embodiment, is configured to use OpenFlow messages to communicate routers and/or switches within backhaul 108. To replace or substitute at least a portion of the functionalities of SGW, PGW, and/or MME, OFNC manager 180, in one aspect, manages and monitors routers or switches 174-178 via backhaul interface 186. For example, various interfaces 182-188 are used to perform certain PCN functions. It should be noted that moving at least a portion of the functions from PCN devices, such as MME, SGW, and PGW, to OFNC 109 will reduce network overhead and improve overall network performance.

AAA interface 188, in one aspect, is configured to use AAA protocols such as Diameter or Radius and enables OFNC 109 to provide AAA functions. OFNC manager 180, in one example, is able to establish direct communications between OFNC with HSS 162, PCRF 102, OFCS 118, and OCS 116 via AAA interfaces. OFNC 109, for instance, communicates with HSS 162 via S6a control message, and communicates with PCRF 102, OFCS 118, OCS 116 using Gx control message, Gy control message, and Gz control message, respectively.

It should be noted that authentication is a process to verify an entity's identity such as UE's phone number or IP address. Authorization is a process to verify whether an entity such as UE is authorized to perform or access certain web activities or resources. Accounting is a process of tracking consumption or usage of network resource by UE for purposes, such as trend analysis, cost allocation, and/or billing. For example, AAA interface 188 is able to use S6a control message 190 to access database in HSS 162 for retrieving user related subscription information. PCRF 102 containing policies and charging rules in real-time and it can be accessed via AAA interface 188 using Gx message 191. OFNC 109, for example, uses Gx message 192 and Gy message 193 to access OFCS 118 and OCS 116 for obtaining charge as well as resource allocation information. In an alternative example, OFNC 109 can be implemented in a cloud based server situated across a network and can be configured to substitute at least a portion of LTE PCN devices using OpenFlow compliant switch(es).

An advantage of using OFNC is that it allows a network operator to add control algorithms to an existing network with relatively simple procedure. Note that added control algorithm may improve network performance, such as enhancing QoS, reducing network congestion, and providing load balancing. OFNC can also be used to support multi-tenancy for virtual network(s) using OpenFlow. For example, OFNC can be operated over a network wide Hypervisor which is capable of partitioning a physical network into multiple independent virtual network environments. Another advantage of using OFNC is that it allows an operator to support Content Delivery Network ("CDN") servers allocated "deeper" in backhaul 108.

Figure 2:
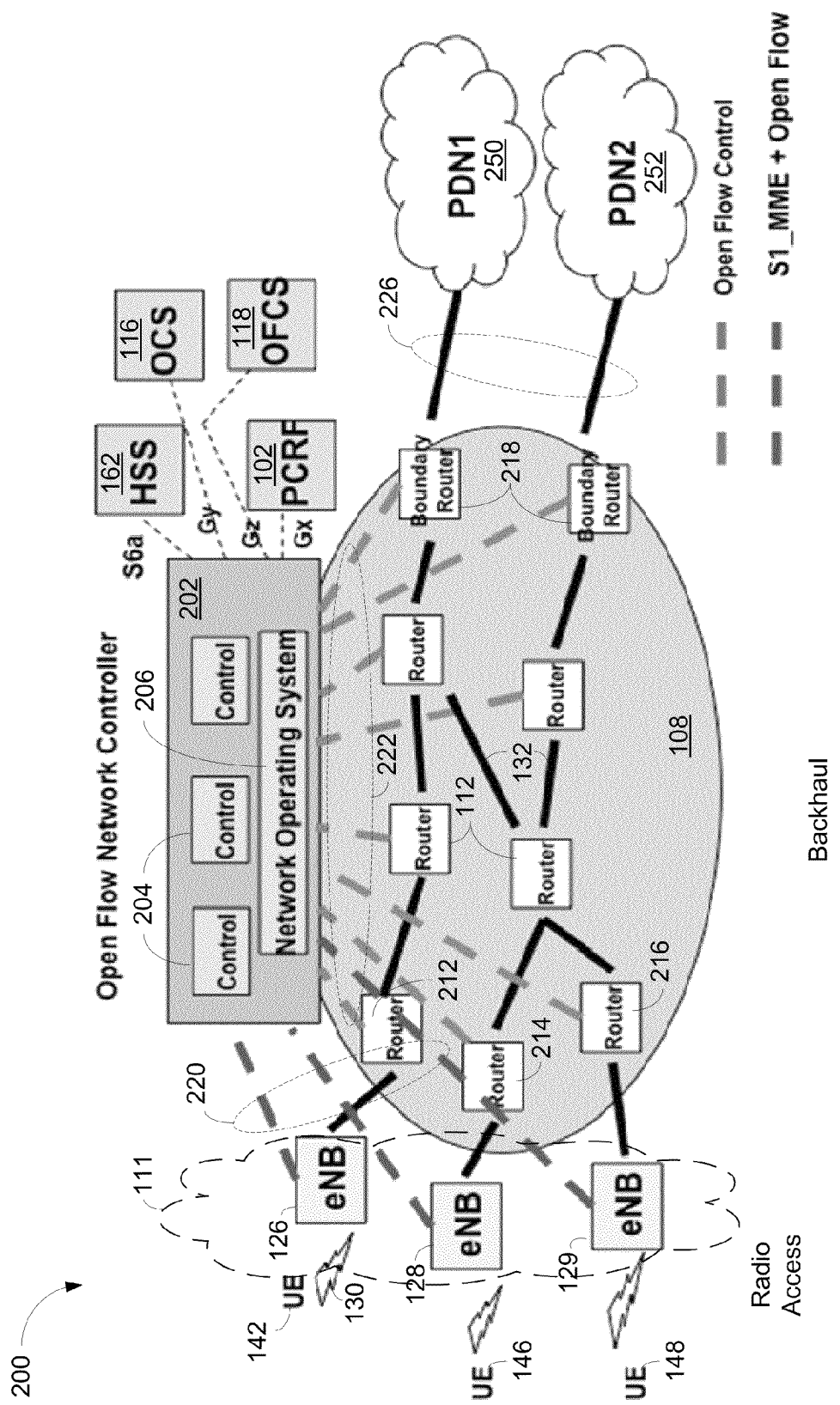
FIGS. 2-3 illustrate a network configuration using OFNC for handling UE network entry in accordance with one embodiment of the present invention.

FIG. 2 is a diagram 200 illustrating a network configuration employing OFNC which is able to handle UE network entry in accordance with one embodiment of the present invention. Diagram 200 includes radio access network 111, backhaul 108, OFNC 202, and PDNs 250-252. OFNC 202, which is similar to OPNC 109 shown in FIG. 1B, includes control or manager 204 and network operating system ("NOS") 206. OFNC 202, in one embodiment, is configured to substitute at least a portion of LTE PCN devices, such as SGW, PGW, and MME, for traffic routing between radio access network 111 and PDNs 250-252. PDN1 or PDN2 may include one or more networks such as Internet. It should be noted that the underlying concept of the exemplary embodiment(s) of the present invention would not change if one or more blocks (or devices) were added to or removed from diagram 200.

OFNC 202 includes a radio access interface, backhaul interface, and AAA interface, wherein the radio access interface is responsible to communicate with radio access network 111 using connections 220. Connections 220, for example, are able to transport messages coded with various protocols such as S1_MME and/or OpenFlow. The backhaul interface employs connections 222 to communicate with routers and/or switches in backhaul 108. The AAA interface uses AAA protocols, such as S6a, Gx, Gy, and Gz, to communicate with AAA devices. Note that the exemplary AAA devices are HSS 162, PCRF 102, OFCS 118, and OCS 116.

Backhaul 108, also known as backhaul network, includes various routers including eNB boundary switches (or routers) 212-216, interior routers 112, and/or edge (or boundary) routers 218. Edge routers 218, in one aspect, are physically situated closer to PDNs 250-252. Similarly, eNB boundary switchers 212-216 are physically located closer to eNBs such as eNBs 126-129. It should be noted that routers in backhaul 108 are interconnected by links and/or connections 132.

The network configuration illustrated in FIG. 2 moves at least a portion of network devices traditionally located in PCN to backhaul 108. For example, a single homogeneous network, which includes OpenFlow compliant switches and/or routers, is able to perform at least a portion of functions including AAA functions that traditionally are performed by MME, PGW, and/or SGW. An advantage of using OFNC that manages routers and/or switches in backhaul 108 is that signaling from UEs such as UEs 142-148 and data plane viewpoint remain the same. Also, OFNC allows base station such as eNBs 126-129 to support S1-MME and/or OpenFlow interface.

OFNC 202, in one example, operates over a layered architecture over NOS 206. NOS 206 may be responsible for communicating and controlling various nodes based on OFNC 202 using OpenFlow. OFNC 202, in one embodiment, maintains a map of network topology and runs various control applications 204 on top of NOS 206. Note that control applications 204 can run their algorithms on logical topology without interfering with distributed aspects of network.

In one embodiment, OFNC 202 is configured to follow certain LTE defined control connections such as S1_MME control. Note that S1_MME control can be applied between OFNC 202 and eNBs 126-129. Non-Access Stratum ("NAS") signaling may be used for communication between UEs 142-129 and eNBs 126-129. An advantage of retaining such control interfaces in OFNC 202 is that it enables the system to use legacy LTE compliant UE and eNB nodes with minimal or no changes. Note that using communication tools, such as S1_MME, Sha, Gx, Gy, Gz, enables OFNC 202 to handle various LTE related activities, such as paging mode, idle mode, authentication, policy control, billing, so forth.

The boundary routers such as routers 218 situated at the edge of backhaul 108 is managed at least partially by OFNC 202. Boundary routers 218 support regular distributed IP routing on their interfaces to IP cloud. OFNC 202 uses boundary or edge routers to control routing traffic flow to and from mobile core side or radio access network. It should be noted that UEs are allocated based on routable IP addresses. The subnets from these IP addresses are advertised by a boundary router which can be an HA (home agent) anchor. In one example, OpenFlow based signaling may be used for rerouting flows in connection to mobility. During an initial network entry, UE authentication, for example, is preformed and NAS signaling is used between UE and OFNC.

OFNC 202 is further configured to control routing paths 132 passing through one or more nodes or routers by means of OpenFlow message. A node may be referred to as a connecting point, distributing point, and/or routing point wherein each node may include a hub, bridge, switch, router, or a group of hubs, bridges, switches, and/or routers. In one aspect, OFNC 202 is able to dynamically facilitate, select, add, delete, and/or change routing path(s) between the routers or nodes for traffic routing based on network status, such as UE mobility, network congestion, and/or link termination(s).

Upon entering in an idle mode, OFNC 202 tears down established links (or paths) associated with the UE which is in the idle mode, and removes entry(s) associated with UE from Flow Table. When a new data packet for UE arrives at a boundary node, OFNC 202 informs the arrival packet to idling UE via a standard OpenFlow mechanism. A paging process to idling UE with S1_MME is activated. Upon detecting a target eNB which is a base station connected to the idling UE, a connection or path is re-established from a gateway or edge router to the target eNB for packet routing.

To support Policy and Charging Control ("PCC"), PCEF function can be performed at the boundary switch wherein OFNC 202 includes Gx, Gy, Gz interfaces used for accessing to policy nodes. Note that OFNC 202, in one example, acts as a proxy and translates multiple interfaces to a single OpenFlow interface for accessing PCEF server. To support QoS, a dedicated bearer can be explicitly setup by OFNC 202. The bearer is established node-by-node passage without tunnels. An advantage of employing OFNC 202 is that it saves network bandwidth since the usage of tunneling is reduced.

Figure 3:
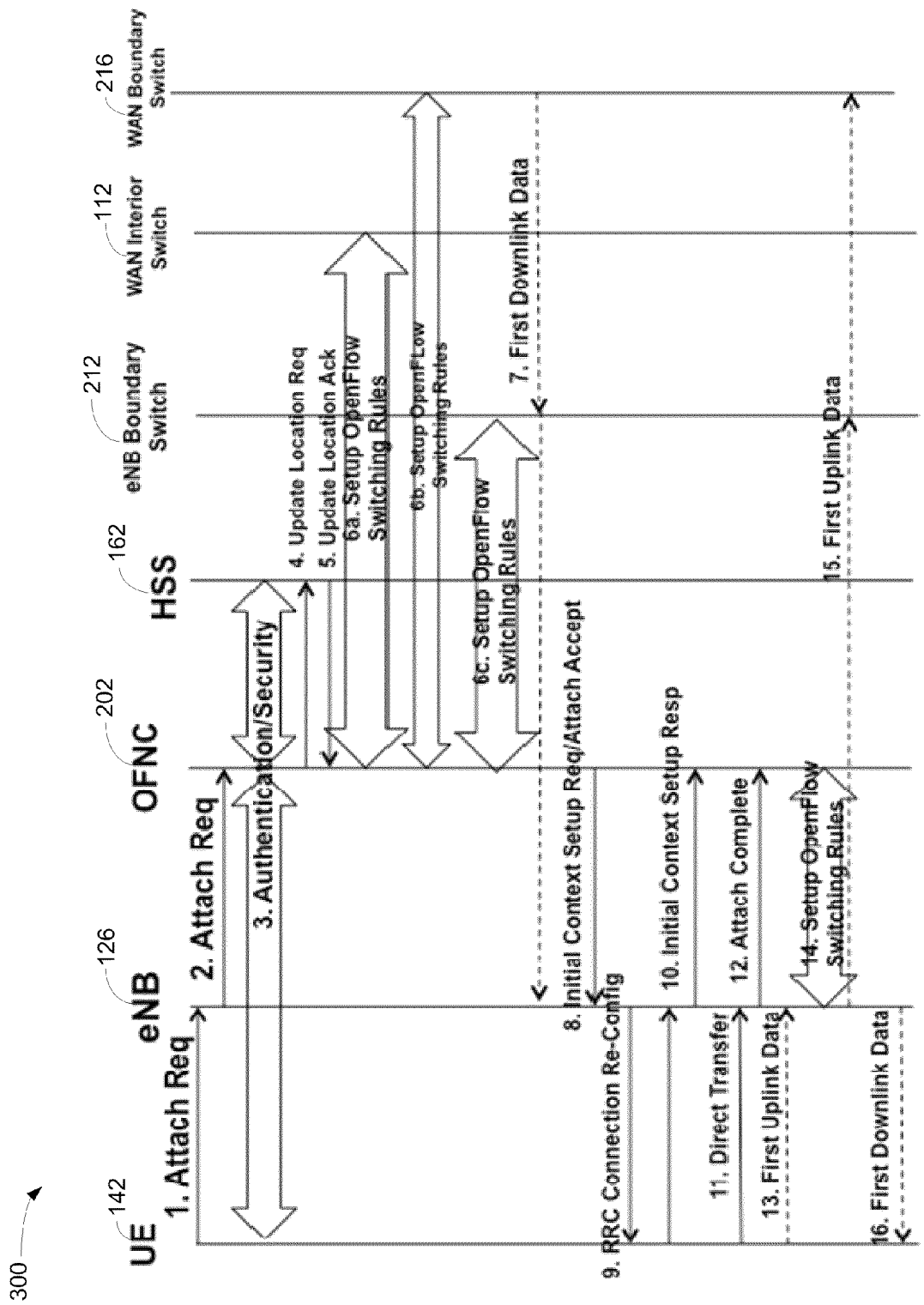

FIG. 3 illustrates a logic diagram 300 showing a process of UE entry in a communications network using OFNC in accordance with one embodiment of the present invention. Diagram 300 includes UE 142, eNB 126, OFNC 202, HSS 162, eNB boundary switch 212, interior switch 112 or wide area network ("WAN") interior switch, and WAN boundary switch 216. Diagram 300 illustrates exemplary signal handshakes between network devices. Note that additional signals may be added in order for the communications taking place.

During operation, UE 142 sends an attach message such as Attach Request to eNB 126. Upon deriving OFNC 202 from GUMMEI information, eNB 126 forwards the Attach Request in S1-MME control message to OFNC 202. UE authentication and security are carried out in accordance with LTE standards. NAS signaling between OFNC 202 and UE 142 is used and performed. After issuing Sha signaling between OFNC and HSS, OFNC 202 sends an update location request to HSS 162 if valid subscription context for UE 142 is not found. Once receipt of update location message, acknowledge ("ACK") message is sent from HSS 162 to OFNC 202. OFNC 202, in one embodiment, ascertains that UE 142 is in tracking area ("TA"). If the authenticity of UE is checked and verified, OFNC 202 constructs a context for UE 142.

After allocating IP address and associated boundary router 216 to UE 142 based on selected PDN type, OFNC 202 selects nodes in the backhaul to route UE traffic. Note that an eNB boundary switch may be chosen because of direct linkage between target eNB and UE 142. OFNC 202 may use different criteria to establish a backhaul path for routing between two end nodes such as between boundary switch 216 and eNB boundary switch 212. A criterion for selecting a routing path is based on current network congestion whereby less congested nodes may be selected. It should be noted that identification of UE traffic in various nodes may be obtained based on destination IP address for downstream traffic, and/or source IP address for upstream traffic. After choosing the nodes, OFNC 202 proceeds to install switching rules in each of the Flow Tables within node(s) using OpenFlow.

After sending a downlink data from boundary switch 216 to UE 142, OFNC 202 forwards a req/attach acceptance to eNB 126. eNB 126 forwards an RRC (radio resource control) connection reconfiguration and an IP address to UE 142. Upon establishing a bearer connection via an air link between eNB 126 and UE 142, OFNC 202 installs OpenFlow switching rules in eNB's Flow Table to complete building of an end-to-end path through the backhaul network.

Figure 4:
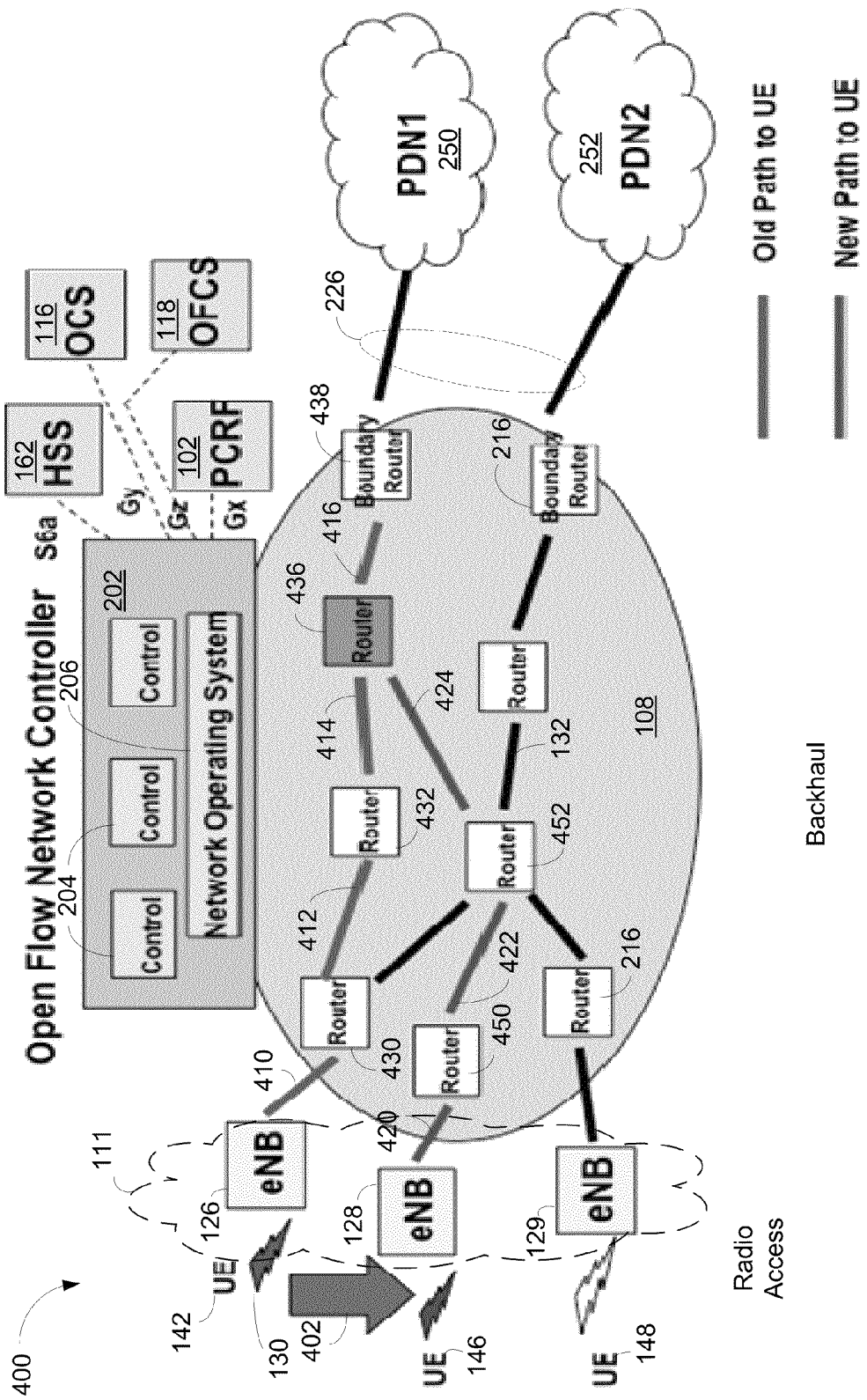
FIGS. 4-5 illustrate a network configuration having OFNC able to facilitate a handover process in accordance with one embodiment of the present invention.

FIG. 4 is a diagram 400 illustrating a network configuration having OFNC able to facilitate a handover process in accordance with one embodiment of the present invention. Diagram 400, which is similar to diagram 200 shown in FIG. 2, includes radio access network 111, backhaul 108, OFNC 202, and PDNs 250-252. OFNC 202 includes application controls 204 and NOS 206. OFNC 202, in one embodiment, is able to perform certain PCN functions which are ordinary performed by SGW, PGW, and/or MME. It should be noted that the underlying concept of the exemplary embodiment(s) of the present invention would not change if one or more blocks (or devices) were added to or removed from diagram 400.

Diagram 400 shows an exemplary handover process when a user at position of UE 142 moves to position of UE 146 as indicated by arrow 402. When the user at position of UE 142, a bearer path which includes target eNB 126, routers 430-438 linked by connections 410-416, is established for routing traffic flows between radio access network 111 and PDNs 250-252. Once the user moves to position of UE 146, a new bearer path, which includes target eNB 128 and routers 450-452, 436-438 connected by connections 420-424 and 416, is established for routing packet flows. OFNC 202, in one embodiment, uses its routing algorithm to decide which router such as router 436 is an appropriate node to switch or split.

OFNC 202 can also be configured to control how and where a new bearer path should be established based on network loading as well as network congestions. For example, OFNC 202 may identify an efficient splitting point or node such as router 436 to minimize overhead. To maintain router 436 as a splitting node between the old bearer path and the new bearer path, overall network overhead or resource can be conserved. For instance, router 436 has the information relating to UE as well as settings relating to routers 436-438 whereby a portion of the old bearer path can be used for the new bearer path.

Figure 5:
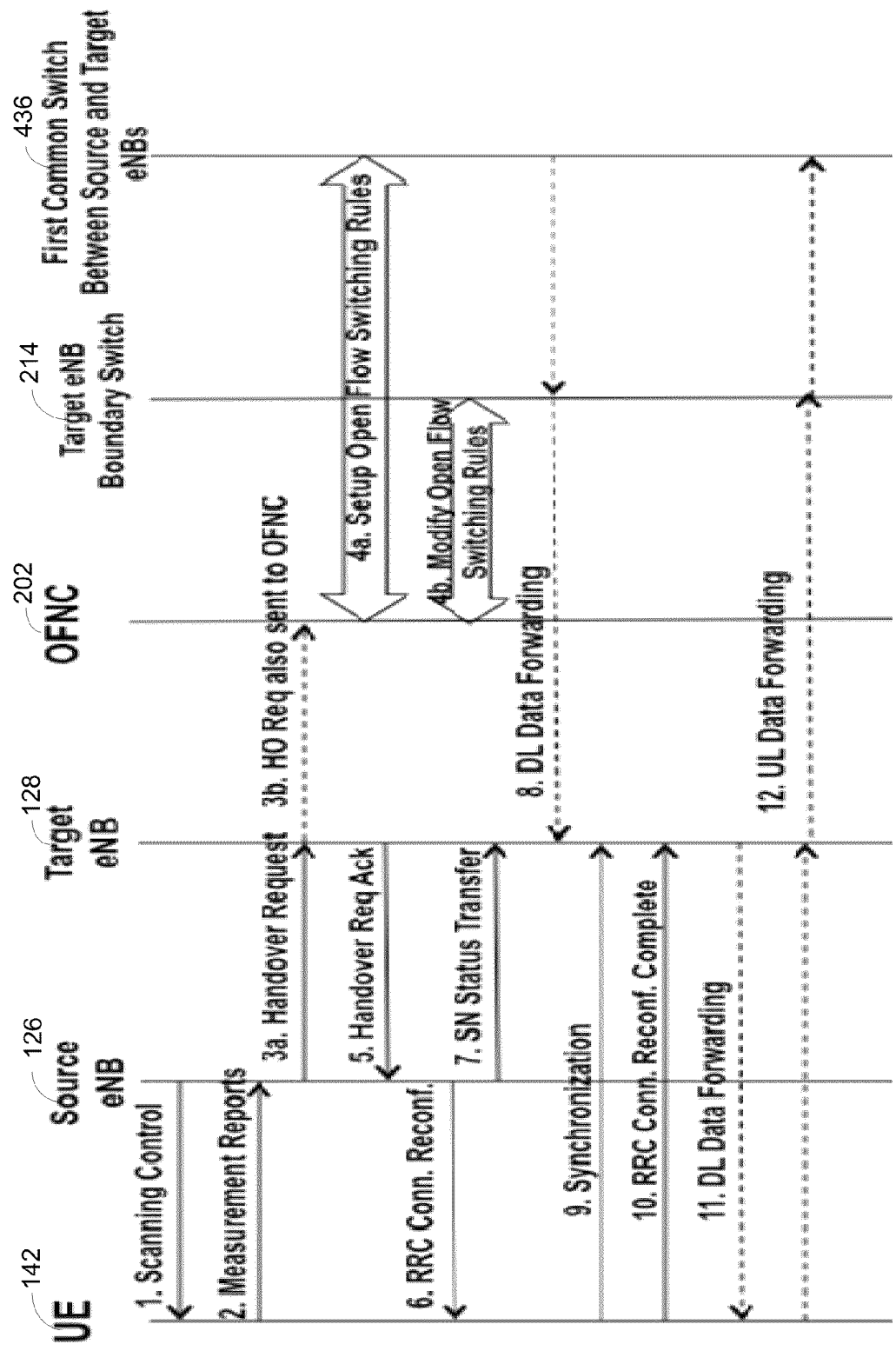

FIG. 5 is a logic diagram 500 illustrating a set of handshaking signals between various network devices for handling a handover in accordance with one embodiment of the present invention. Diagram 500 includes UE 142, eNBs 126-128, OFNC 202, target eNB boundary switch 214, interior switch 436 wherein switch 436 is a common switch or splitting node between a source eNB 126 and target eNB 128. It should be noted that UE context within source eNB 126 may contain roaming information which provides connection establishment or last TA update.

After issuing a scanning control, eNB 126 subsequently receives a measurement report from UE 142 indicating mobility. When source eNB 126 decides to handover network service relating to UE 142 in accordance with the measurement report, eNB 126 issues a Handover Request to target eNB 128. The Handover Request is subsequently forwarded to OFNC 202 since switching rule for sending such message is with OFNC 202. Upon receipt of Handover Request, OFNC 202 begins a process of rerouting traffic switching rules from source eNB 126 to target eNB 128. After downlink data is sent, UE 142 and target eNB 128 are synchronized, and RRC connection reconfiguration message is sent/completed. Target eNB 128 subsequently forwards downlink data to UE 142, and routes the uplink data to a boundary router via one or more common switches such as router 436.

Deploying OFNC 202 in a network configuration provides additional flexibility in assigning and/or allocating new path (s) as well as choosing a path based on predetermined network factors. The network factors can be real-time network status or predefined parameters, such as traffic congestion, load balance, available bandwidth, et cetera. It should be noted that steps or actions not mentioned above continue to follow the conventional LTE approaches.

Figure 6:
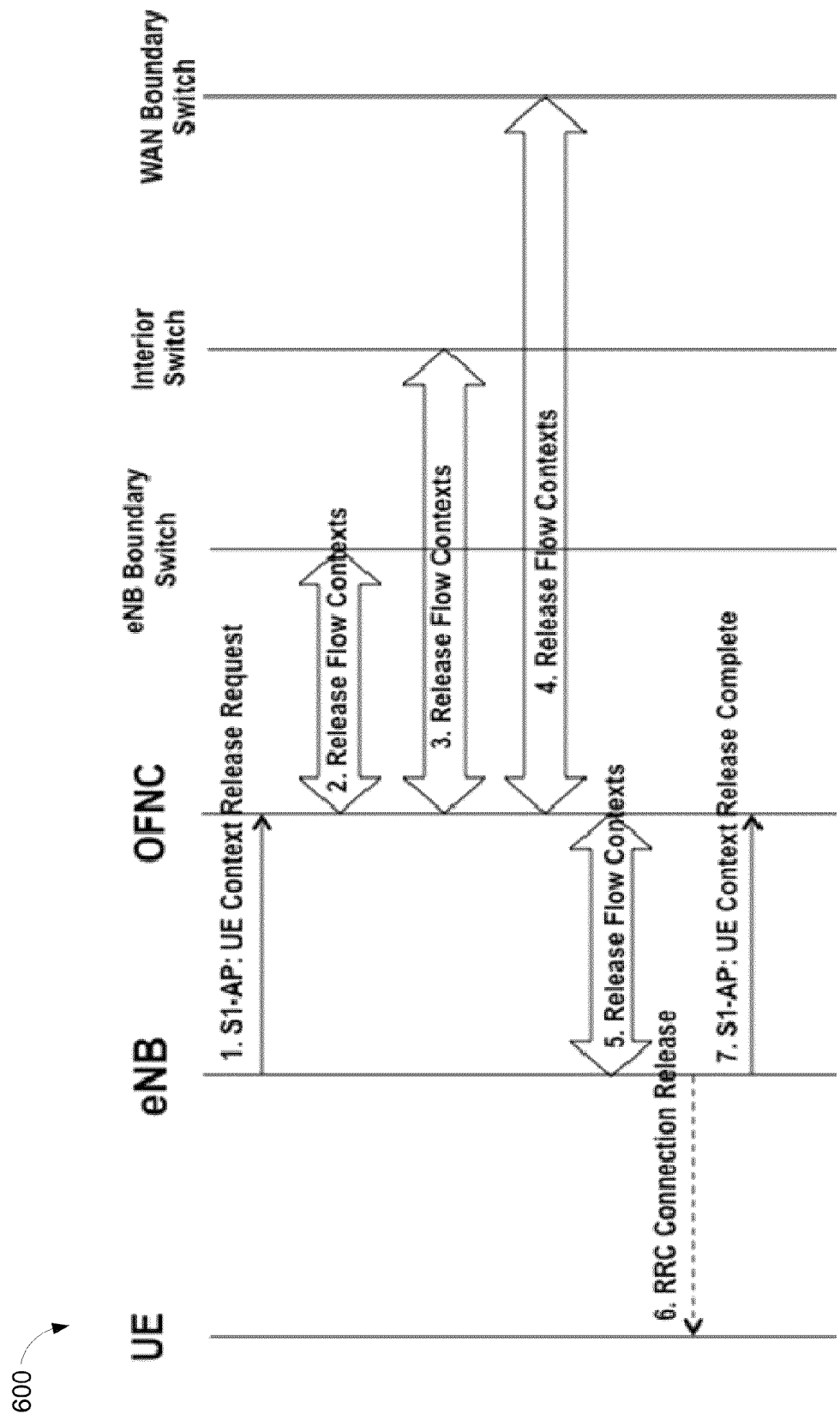
FIGS. 6-8 are logic diagrams illustrating an exemplary process of OFNC for handling idle state in accordance with one embodiment of the present invention.

FIG. 6 is a logic diagram 600 illustrating an idle process for a network having an OFNC in accordance with one embodiment of the present invention. Diagram 600 demonstrates a procedure in which the state of UE changes from ECM-Connected state to ECM-Idle state. Once the UE is in the ECM-Idle state, all UE related context information is deleted or removed from related eNB(s) and/or switches. OFNC is able to manage the process of releasing or removing UE contexts from eNB boundary switch, interior switch, and/or edge switch using OpenFlow. OFNC is also able to removing various switching rules from bearer(s) and/or nodes associated with the idling UE including path(s) from ingress to egress nodes. In one aspect, OFNC can be configured to retain certain information relating to the idling UE for future reference. For example, OFNC can use retained information to reactivate the idling UE quickly when it is triggered by network and/or user. Note that if OFNC contains idling UE context, the idling UE can be quickly activated without running a full signaling procedure.

Figure 7:
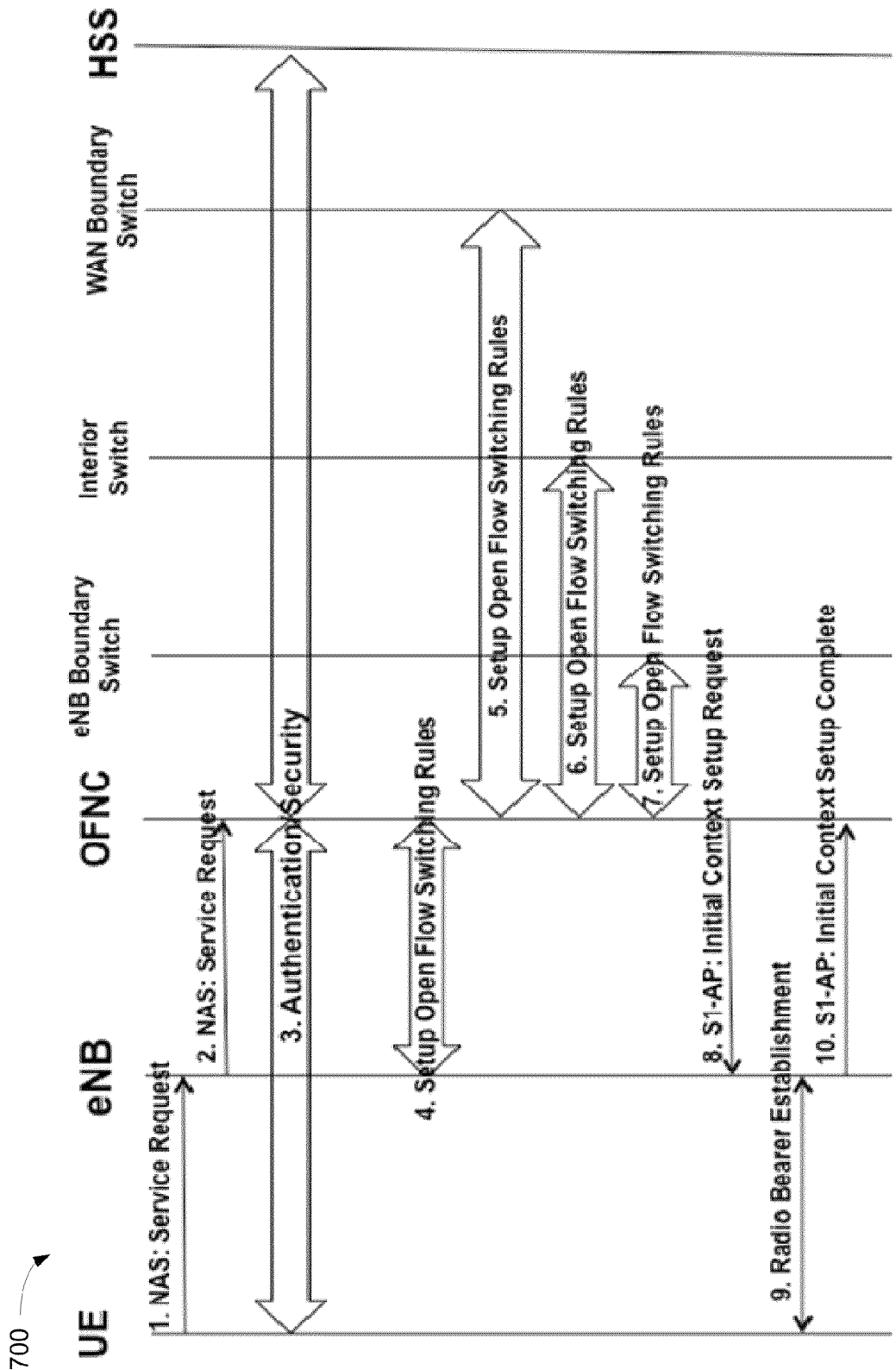

FIG. 7 is a logic diagram 700 illustrating an exemplary process of reactivating an idling UE in response to a user trigger in accordance with one embodiment of the present invention. After issuance of service request by the idling UE, eNB forwards the request from UE to OFNC. Upon authenticating the identity of idling UE in accordance with information in HSS, OFNC sets up or downloads OpenFlow switching rules to network devices situated between eNB and routers, which includes, but not limited to, WAN boundary switch and interior switch(s). After setting up the OpenFlow switching rules, OFNC issues an initial context setup request to eNB. Once a radio bearer between UE and eNB is established, the setup for initial context associated with UE is completed.

Figure 8:
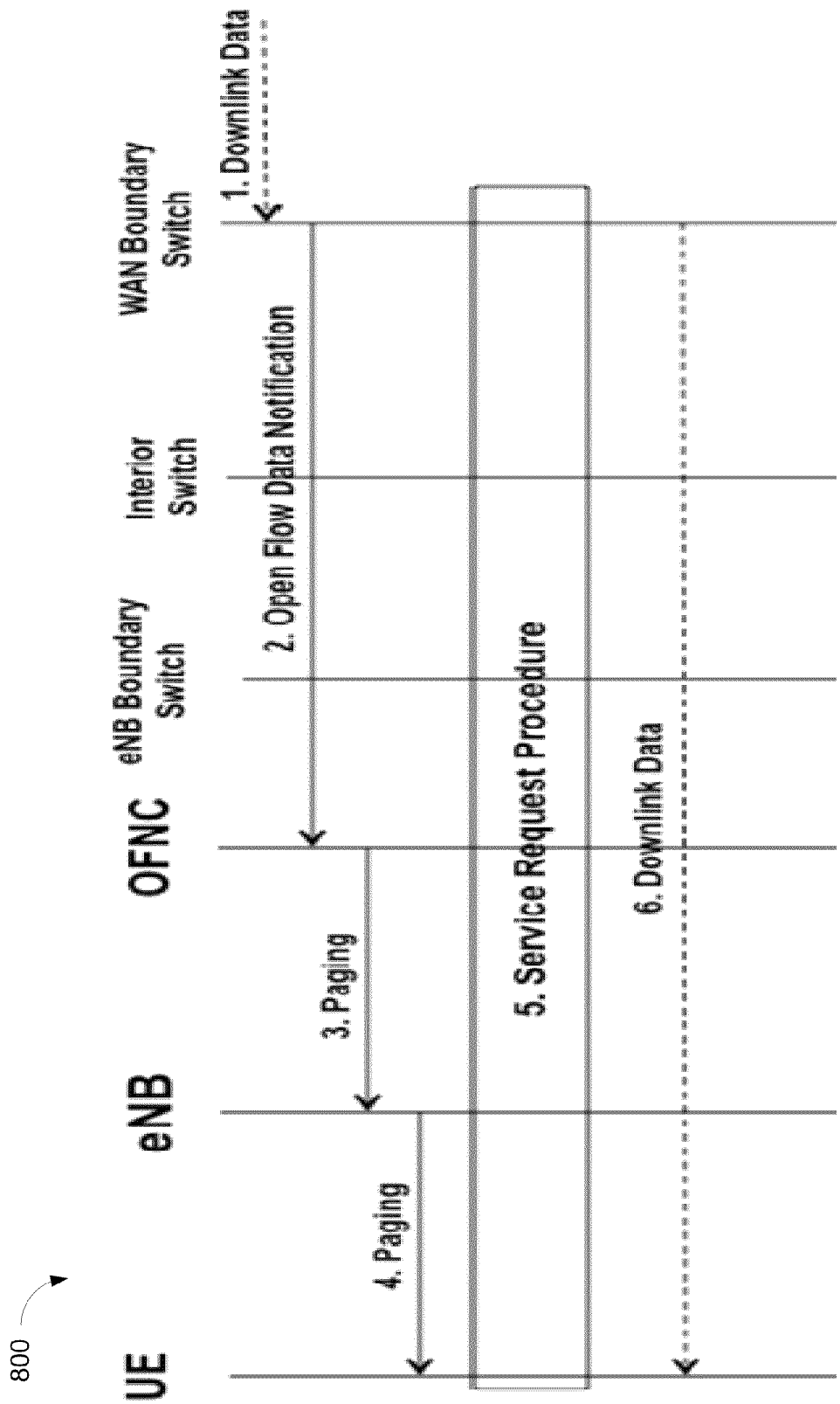

FIG. 8 is a logic diagram 800 illustrating an exemplary process of activating or waking up an idling UE in response to a network trigger in accordance with one embodiment of the present invention. After receipt of downlink data from the network, WAN boundary switch sends an OpenFlow data notification to OFNC. OFNC is able to page the idling UE using paging message(s) via eNB in accordance with the notification. Upon completing service request procedures, the downlink data is forwarded to UE as shown in diagram 800.

It should be noted that an idling UE can be woken or reactivated by a user trigger, network trigger, or both. Upon detecting a trigger, OpenFlow procedure(s) is preformed to recreate paths for a bearer in a backhaul network. If OFNC retains certain context information relating to idling UE, the idling UE can be activated quickly. For a network triggering scenario, OFNC pages idling UE using S1-MME interface via eNBs in TA.

Figure 9:
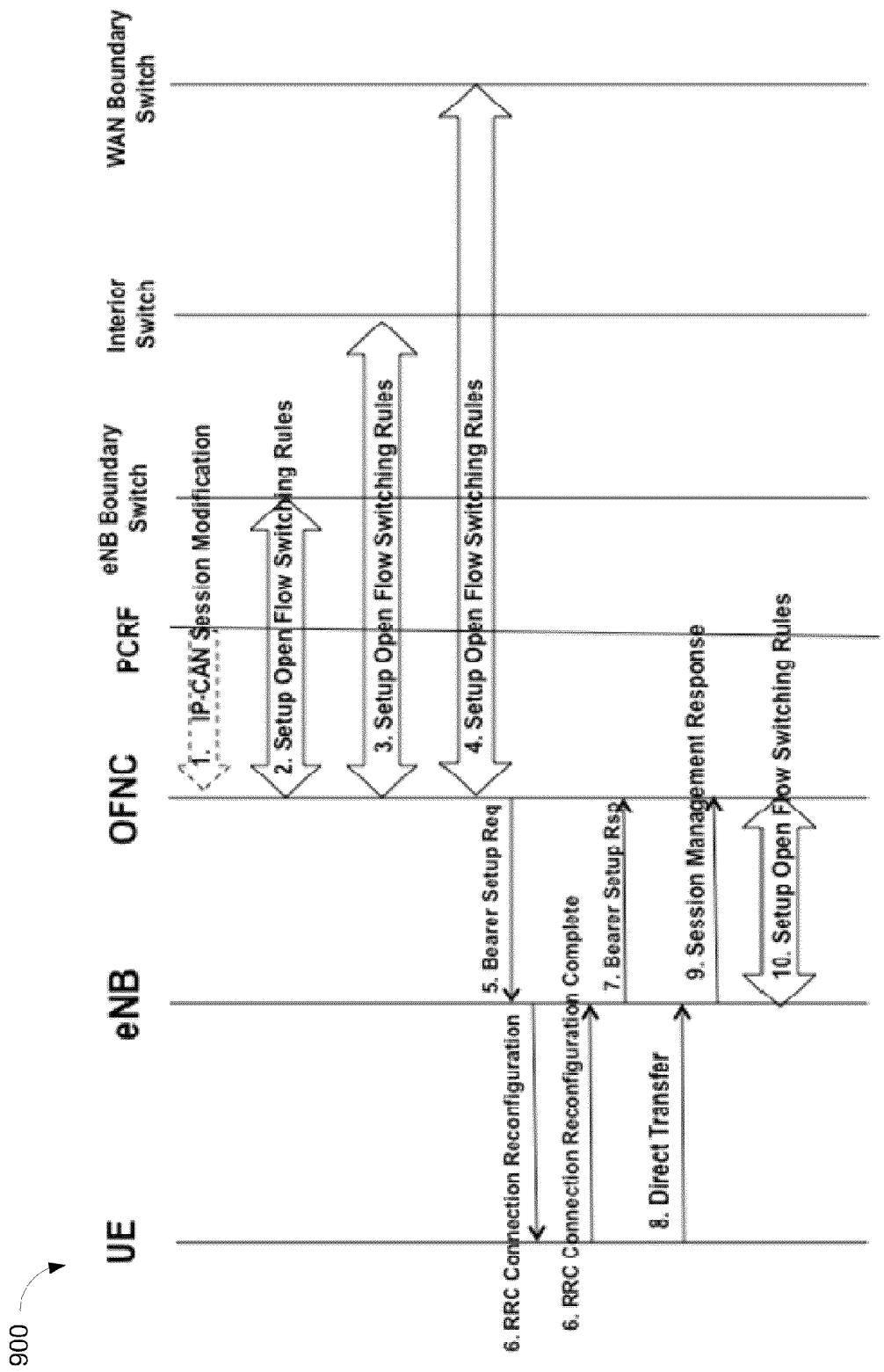
FIG. 9 is logic diagram illustrating an exemplary process of handling QoS in accordance with one embodiment of the present invention.

FIG. 9 is logic diagram illustrating an exemplary process of handling QoS in accordance with one embodiment of the present invention. QoS for an end-to-end connection encompasses various considerations, such as, Admission Control, scheduling, bandwidth ("BW") management, and the like. Admission Control, for example, is a validation process in a communication system to verify or ascertain whether available resources are sufficient for proposed connection. BW management is a process of measuring and controlling traffic flows on a link or connection. It should be noted that filling link to the capacity or overfilling can result in network congestion which will negatively affect the overall network performance.

In one aspect, each of OpenFlow switches in the backhaul network supports differentiated service ("DiffServ") which specifies a simple, scalable and coarse-grained mechanism for classifying and managing traffic flows in view of QoS. DiffServ type QoS control, in one example, may include several classes, such as a single Expedited Forwarding ("EF") class, multiple Assured Forwarding ("AF") classes, and a single Best Effort ("BE") class. OFNC, in one embodiment, is configured to allocate bandwidth to EF, AF, and BE classes at each node based on network resource availabilities. It should be noted that OpenFlow switches, for instance, support the implementation of traffic shaping and policing on per flow basis.

Diagram 900 illustrates control flows to setup a new dedicated bearer capable of guaranteeing delivery of specified QoS. The PCRF initially passes classification rules and QoS parameters to OFNC. QoS parameters includes, but not limited to, MBR (maximum bit rate), GBR (guaranteed bitrate) and ARP (Allocation and Retention Priority) values. OFNC, in one embodiment, assigns MBR values to boundary router for controlling shaping and/or policing. In addition, OFNC can be configured to track available bandwidth in each traffic class (EF, AF1, AF2 etc) at each switch along the path or bearer. If the admission control succeeds, OFNC, for example, sets up OpenFlow switching rules for the bearer at each of the selected switches (see steps 2, 3 and 4 in diagram 900). After setting up a bearer across the radio link, the eNB performs a process of admission control across the radio link, and conveys the results to OFNC. The new bearer is created when the admission control across both the backhaul and the radio links are performed. OFNC sends or records the setup information to PCRF.

Figure 10:
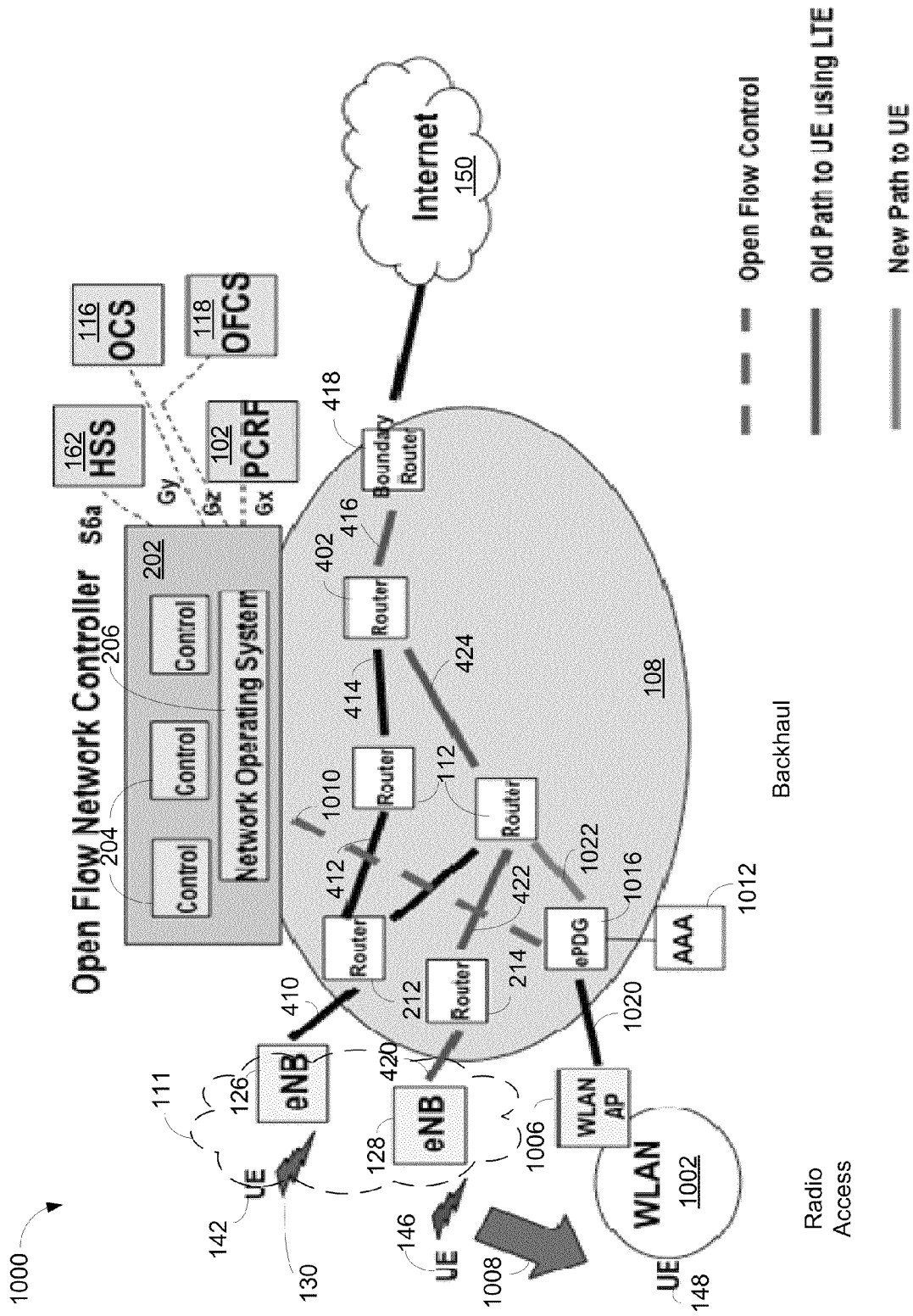
FIGS. 10-11 illustrate an exemplary network configuration employing OFNC for handling traffic flows between WLAN and PDN in accordance with one embodiment of the present invention.

FIG. 10 is a diagram 1000 illustrating an exemplary network using OFNC for handling traffic flows between WLAN and PDN in accordance with one embodiment of the present invention. Diagram 1000, which is similar to diagram 400 shown in FIG. 4, includes radio access network 111, backhaul 108, OFNC 202, and Internet 150. OFNC 202, in one embodiment, is able to perform certain functions previously performed by SGW, PGW, and MME, and is used to replace at least a portion of functions performed by SGW, PGW, and MME. It should be noted that the underlying concept of the exemplary embodiment(s) of the present invention would not change if one or more blocks (or devices) were added to or removed from diagram 1000.

Diagram 1000 includes WLAN 1002 and WLAN access point ("AP" or "WAP") 1006 wherein AP 1006 is further coupled to an evolved packet data gateway ("ePDG") 1016 via connection 1020. ePDG 1016, in one aspect, is located in backhaul 108, and is coupled to AAA server 1012. ePDG 1016, which can also be referred to as enhanced packet data gateway, is configured to handle interface between an untrusted non-3rd Generation Partnership Project ("3GPP") network and the EPC network using established secure channel(s). An untrusted non-3GPP network can be a wireless communications network such as Wi-Fi hot spot. For example, ePDG 1016 is able to establish an Internet Protocol Security ("IPSec") connection 1020 for transporting data to and from a trusted and/or an untrusted non-3GPP wireless network.

WLAN 1002 is connected to ePDG 108 and UE 148 via WP 1006. Note that WLAN can be established based on IEEE 802.11 standards. WLAN provides a local coverage area with various APs permitting a UE to access one of the nearest APs 1006 for network service. It should be noted that when a UE is capable of operating under both LTE 111 and WLAN 1002, some traffic is received via LTE 111 cellular connection while others may be received via WLAN 1002.

Diagram 1000 illustrates a network scenario in which a UE moves from coverage of LTE network 111 to coverage of WLAN 1002. The operator deploys ePDG node 1016 in order to enable inter-operability between LTE 111 and WLAN 1002. In one aspect, ePDG 1016 is responsible for authenticating UE 148 and sets up secure IPSec tunnels such as connection 1020. OFNC sets up all paths within backhaul network 108 using OpenFlow since GTP and/or MIP tunneling is not used.

Figure 11:
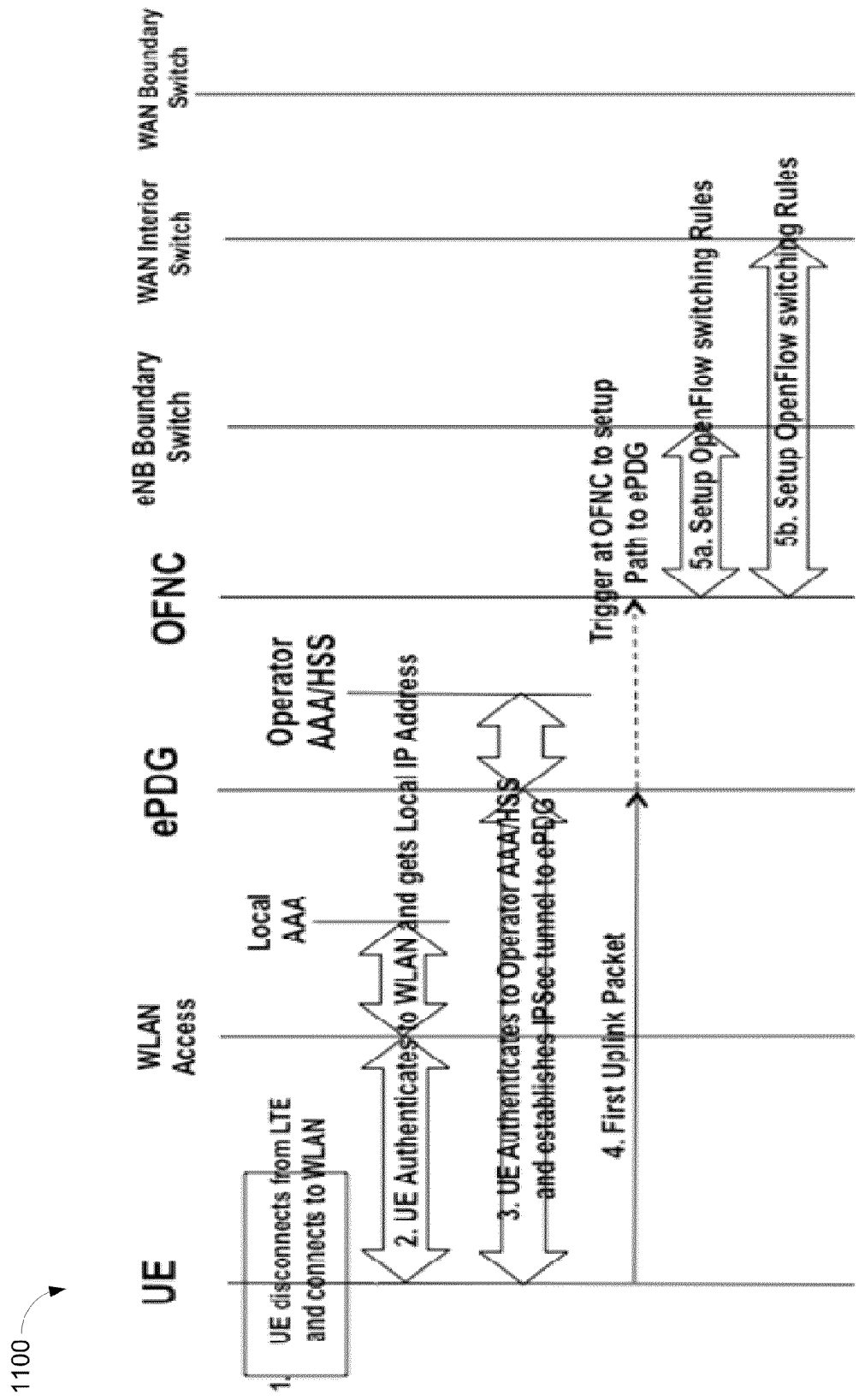

FIG. 11 is a logic 1100 diagram illustrating an exemplary process of handling traffic flows between WLAN and PDN in accordance with one embodiment of the present invention. Diagram 1100 shows signaling flows indicating a UE moving from LTE to WLAN. After synchronizing with WLAN network, a user of UE or UE is authenticated by WLAN, and a local IP address for UE is subsequently acquired and/or assigned. UE uses the assigned IP address to communicate with ePDG in a core network. During operation, UE sends assigned IP address to ePDG wherein the IP address may be used at a later time. When UE sends its first upstream packet, ePDG is triggered. ePDG forwards the packet to OFNC since the switching rules have probably not yet installed. OFNC is capable of setting up a path between ePDG and a boundary router.

Figure 12:
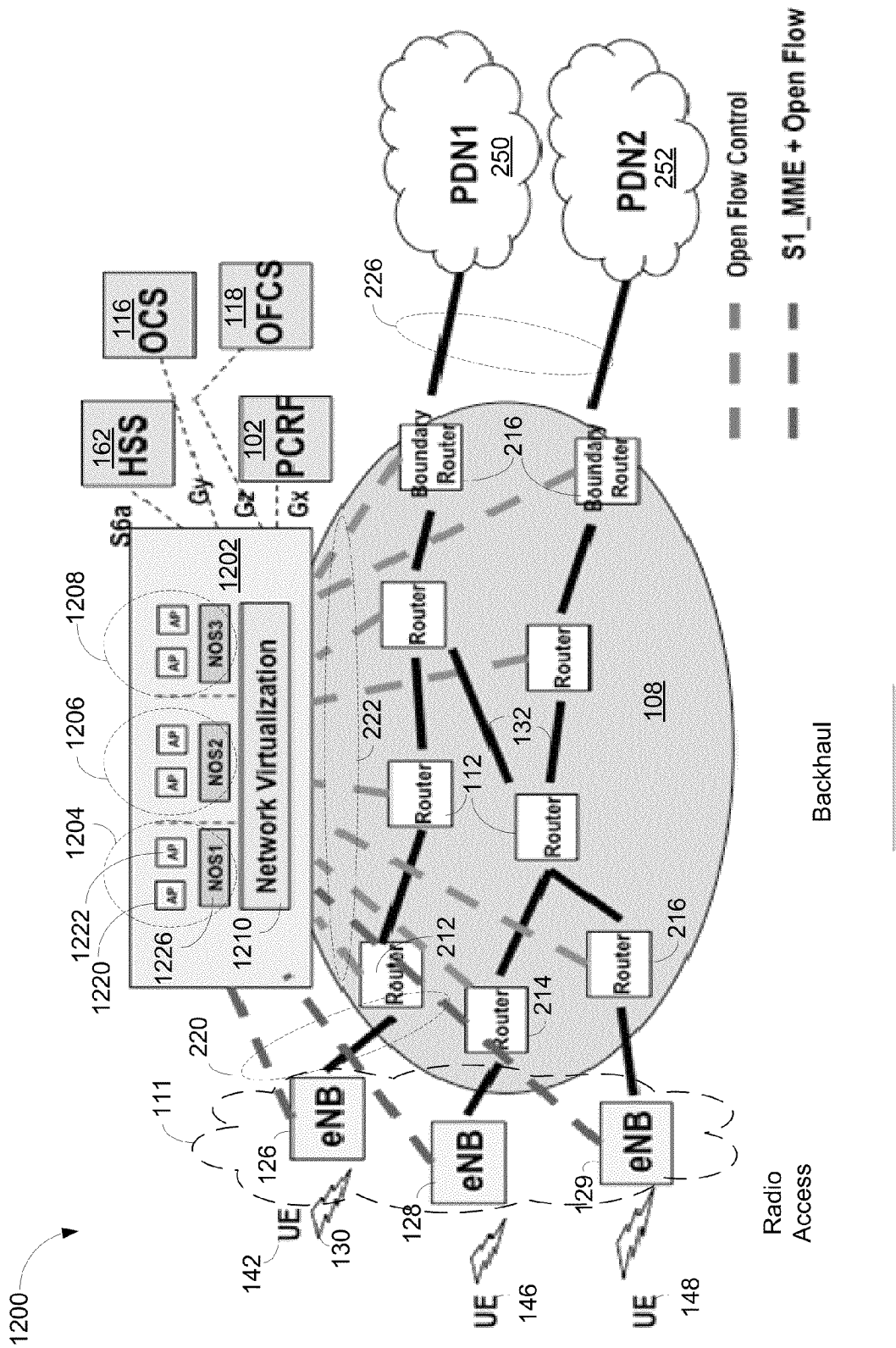
FIG. 12 illustrates a network configuration employing a virtualized OFNC able to operate multiple network operating systems simultaneously in accordance with one embodiment of the present invention.

FIG. 12 is a diagram 1200 illustrating a network configuration using virtualized OFNC able to operate multiple NOS simultaneously in accordance with one embodiment of the present invention. Diagram 1200, which is similar to diagram 200 shown in FIG. 2, includes radio access network 111, backhaul 108, virtualized OFNC 1202, and PDNs 250-252. OFNC 1202, which is similar to OPNC 109 shown in FIG. 1B, includes multiple control or managers 1220-1222 running over multiple NOS 1204-1208. OFNC 1202, in one embodiment, is used to substitute SGW, PGW, and MME and is able to route data traffic or traffic flows between radio access network 111 and PDNs 250-252. It should be noted that the underlying concept of the exemplary embodiment(s) of the present invention would not change if one or more blocks (or devices) were added to or removed from diagram 1200.

OFNC 1202, in one embodiment, includes a network virtualization layer 1210 wherein layer 1210 hosts multiple NOS capable of running simultaneously. Virtualization allows OFNC to provide segregated network running concurrently with other segregated network(s). Note that OFNC 1202 provides a network wide virtual view of all available resources.

Figure 13:
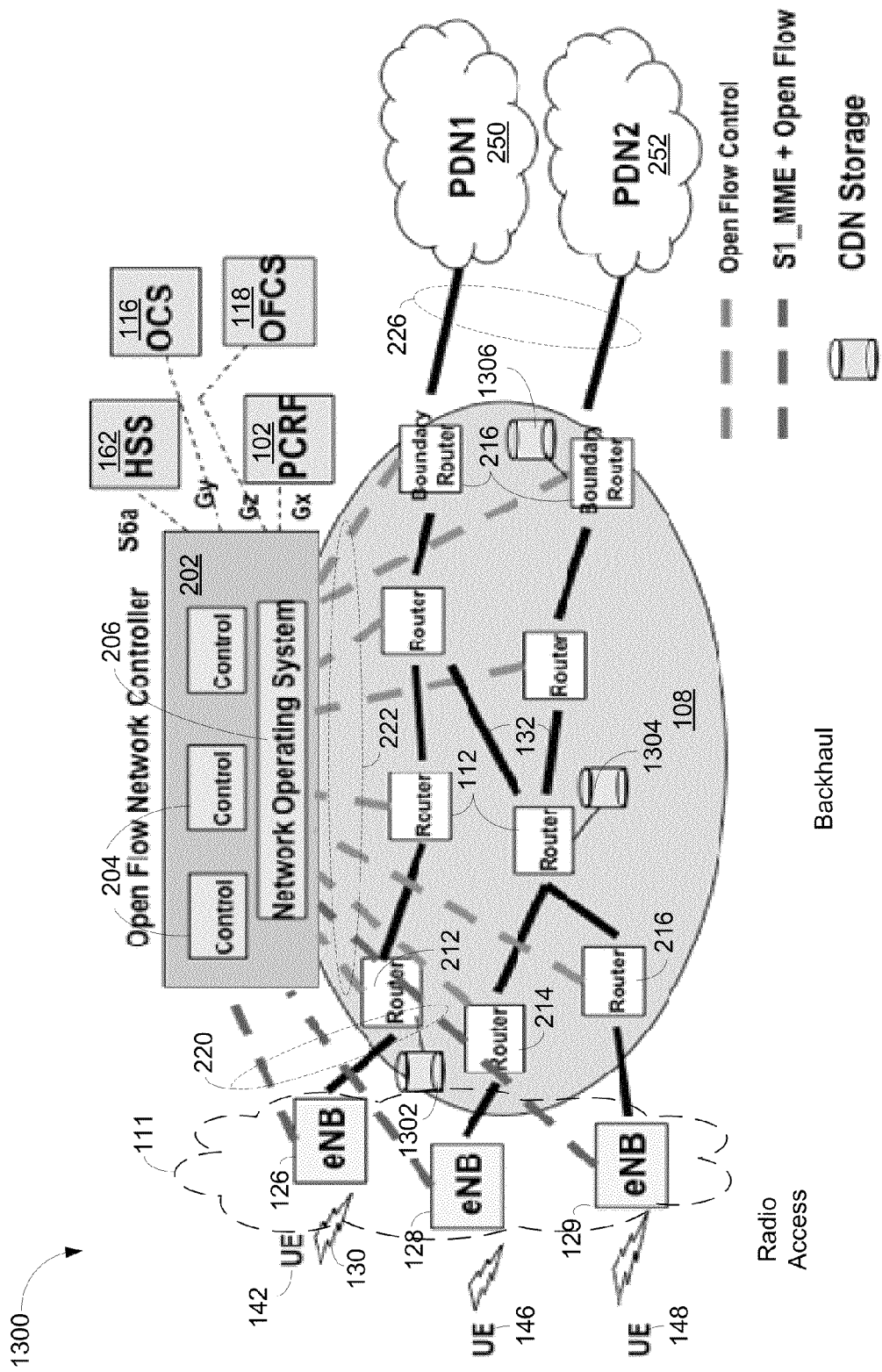
FIG. 13 illustrates a network configuration employing OFNC able to support mobile content delivery networks ("CDNs") in accordance with one embodiment of the present invention.

FIG. 13 is a diagram 1300 illustrating a network configuration using OFNC able to support mobile content delivery networks ("CDNs") in accordance with one embodiment of the present invention. Diagram 1300, which is similar to diagram 200 shown in FIG. 2, includes radio access network 111, backhaul 108, OFNC 202, and PDNs 250-252. OFNC 202, which is similar to OPNC 109 shown in FIG. 1B, includes multiple control or managers 204 running over NOS 206. OFNC 202, in one embodiment, is used to substitute SGW, PGW, and MME and is able to route data traffic or traffic flows between radio access network 111 and PDNs 250-252.

Placing multiple mobile CDNs 1302-1306 in backhaul 108 is to improve efficiency of CDS access since a CDS may be accessed based on distance and availability with regard to UE or routers. CDNs 1302-1306 are distributed servers situated in multiple data centers across the network such as backhaul and/or Internet. A purpose of using multiple CDNs is to serve content to end-users with high availability and high performance. For example, CDN is generally able to provide large amount of content, such as web objects (text, graphics, URLs and scripts), downloadable objects (media files, software, documents), applications (e-commerce, portals), video streaming, on-demand streaming media, social networks, and the like, to users. OFNC, in one aspect, can be configured to associate CDN storage nodes with certain OpenFlow switches in backhaul 108. For example, CDN 1302 is assigned to serve data to eNB 126 and router 212 while CDN 1306 provides data to eNB 129 and router 112. When a UE, for example, moves from eNB 126 to eNB 129, OFNC 202 redirects flow routing from CDN 1302 to CDN 1304. An advantage of using OFNC in a network is that it enhances mobility control and simplifying routing.

The exemplary aspect of the present invention includes various processing steps, which will be described below. The steps of the aspect may be embodied in machine, router, or computer executable instructions. The instructions can be used to create a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 14:
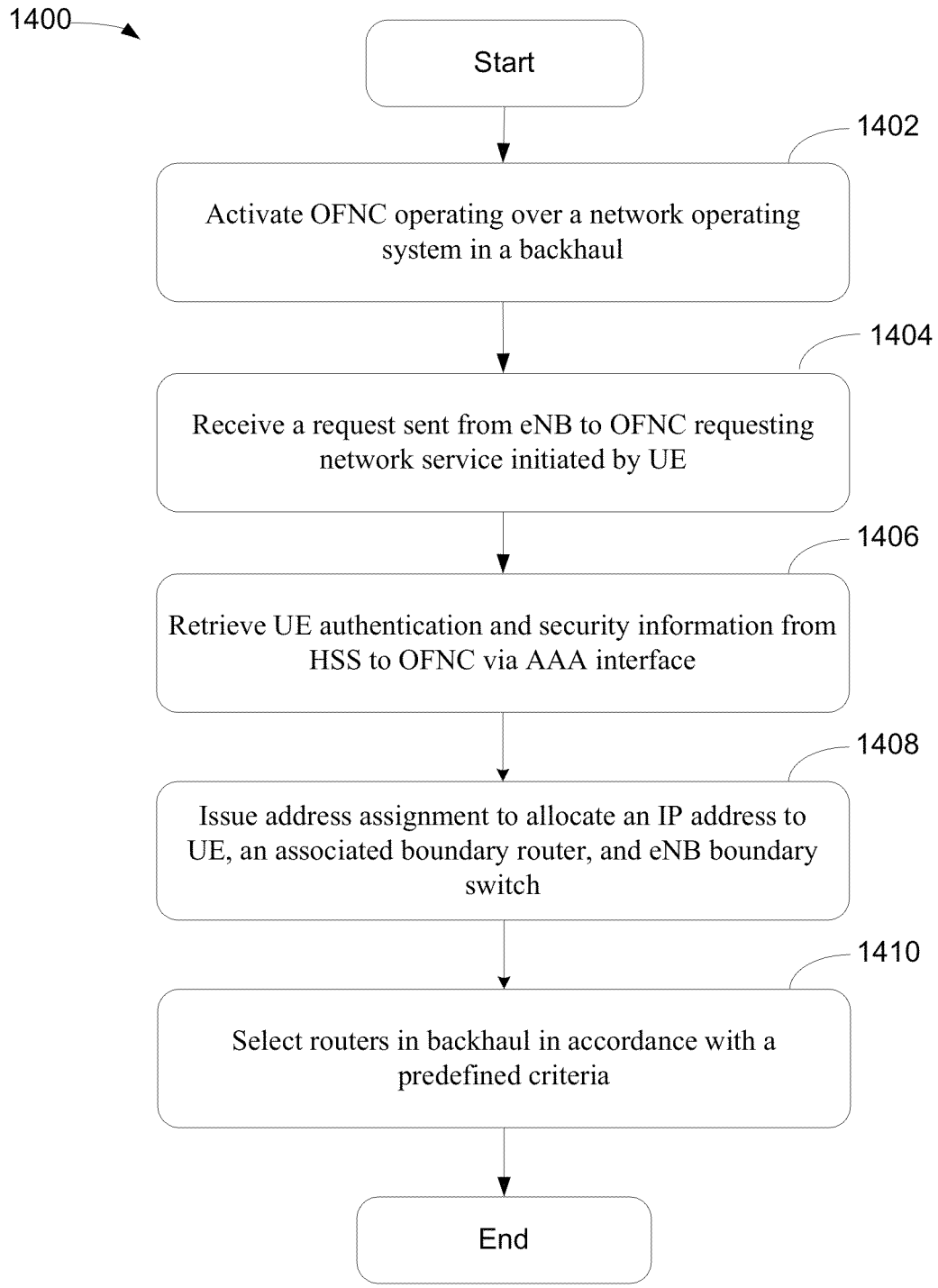
FIG. 14 is a flowchart illustrating an exemplary process of OFNC operating in a network in accordance with one embodiment of the present invention.

FIG. 14 is a flowchart illustrating an exemplary process of OFNC operating in a network in accordance with one embodiment of the present invention. At block 1402, a process capable of routing network flows activates OFNC operating over a network operating system in a backhaul. OFNC may reside in a server, router, switch, or a combination of server, router, and switch.

At block 1404, a request sent from a UE to OFNC requesting network service initiated is received. In one aspect, Attach Request is forwarded from UE to eNB via a cellular network. Note that Attach Request may be forwarded from eNB to OFNC via S1_MME message.

At block 1406, OFNC is capable of retrieving information relating to authentication and security from HSS via AAA interface. UE authentication is subsequently verified if valid subscription and/or context associated with UE is retrieved from HSS. Alternatively, OFNC issues an update location request to HSS if no valid subscription context can be found.

At block 1408, OFNC issues an address assignment to allocate an IP address to UE. To improve network efficiency, a switch in the backhaul having a relatively direct link between target eNB and UE is selected for providing network service. A boundary router is subsequently identified based on destination IP address for downstream traffic.

At block 1410, OFNC selects one or more routers in the backhaul in accordance with a set of predefined criteria to provide network service. Various interior switches are selected for connecting between eNB boundary switch and boundary router based on, for example, a least congested path. Note that switching rules should be installed in flow tables at various nodes. Information relating to policy control and billing policy can be obtained from PCRF, OCS, and OFCS. Switching rules may be set in routers based on the information obtained from PCRF, OCS, and OFCS.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. Network configuration capable of routing packet flows, comprising:
   a cellular base station, having at least one radio transmitter, radio receiver, and logic control management, configured to provide wireless communication for a plurality of user equipments ("UEs");
   a packet data network ("PDN") able to route packets to and from the cellular base station;
   a backhaul containing a routing controller and configured to logically situated between the PDN and the cellular base station, the routing controller configured to manage a plurality of routers including at least one edge router via OpenFlow protocol and operable to establish a routing path between the cellular base station and the PDN via a portion of the plurality of routers in accordance with information from an authenticating server and a charging system; and
   a target evolved Node B ("eNB") boundary switch configured to have a direct link to a target eNB and configured to be logically situated at boundary of the backhaul responsible to communicate with the target eNB,
   wherein the routing controller forwards OpenFlow switching rules to the target eNB for setting up a new routing path to one or more interior switches in the backhaul network between the target eNB and a boundary router.

2. The configuration of claim 1, wherein the cellular base station includes one or more evolved Node Bs ("eNBs") which are radio access portion of Universal Mobile Telecommunications System ("UMTS") Long Term Evolution ("LTE") system able to scheduling resource between UEs and eNB.

3. The configuration of claim 2, wherein the routing controller is an OpenFlow network controller ("OFNC") capable of operating over a network operating system and communicating with eNBs via mobility management entity ("MME") protocol.

4. The configuration of claim 3, wherein the OFNC includes a digital processing component able to establish an efficient routing path between the eNB and PDN via an eNB boundary switch, one or more interior switches, and a boundary switch based on traffic congestion and quality of service ("QoS").

5. The configuration of claim 3, wherein the OFNC includes an S6a interface configured to communicate with a home subscriber server ("HSS") via S6a connection.

6. The configuration of claim 3, the OFNC includes an authentication, authorization, and accounting ("AAA") interface configured to communicate with policy and charging rules function ("PCRF") via Gx control message, online charging server ("OCS") via Gy control message, and offline charging system ("OFCS") via Gz control message.

7. The configuration of claim 3, the OFNC is configured to include a network virtualization layer which is able to host a plurality of network operating systems.

8. The configuration of claim 3, wherein the plurality of routers forms at least a portion of backhaul including a plurality of boundary routers and target eNB boundary routers.

9. The configuration of claim 8, wherein the OFNC includes a mobile content delivery network ("CDN") selector capable of dynamically selecting one of CDNs that is situated closer to a UE in the backhaul for content delivery.

10. The configuration of claim 1, further comprising an evolved packet data gateway ("ePDG") coupled to the routing controller and configured to facilitate packet flows between wireless local area network ("WLAN") and Internet.

11. A method for routing network flows, comprising:
   activating an OpenFlow network controller ("OFNC") operating over a network operating system in a backhaul;

receiving a request sent from an evolved Node B ("eNB") to the OFNC requesting network service initiated by a user equipment ("UE");

retrieving UE authentication and security information based on subscriber data from a home subscriber server ("HSS") to the OFNC via an authentication, authorization, and accounting ("AAA") interface of the OFNC operable to handle information formatted in AAA protocol;

forwarding OpenFlow switching rules from the OFNC to a target eNB for setting up a new routing path to one or more interior switches in the backhaul network between the target eNB and a boundary router issuing address assignment by the OFNC to allocate an Internet Protocol ("IP") address to the UE, an associated boundary router, and eNB boundary switch;

selecting one or more routers in the backhaul by the OFNC in accordance with a predefined criteria to provide requested network service to the UE; and identifying a target eNB boundary switch which has a direct link to the target eNB and is logically situated at boundary of the backhaul responsible to communicate with the target eNB.

12. The method of claim 11, wherein receiving a request from the eNB includes,
   initiating an Attach Request from the UE to the eNB via a cellular network; and
   forwarding the Attach Request from the eNB to the OFNC via S1_MME message.

13. The method of claim 12, further comprising verifying UE authentication if valid subscription context for the UE is retrieved from HSS via Sha signaling message.

14. The method of claim 12, further comprising sending an update location request to the HSS from the OFNC if valid subscription context for the UE is not found in HSS.

15. The method of claim 12, wherein issuing address assignment by the OFNC includes,
   selecting a switch in the backhaul having a relatively direct link between a target eNB and the UE; and
   identifying the boundary router based on destination IP address for downstream traffic.

16. The method of claim 12, further comprising selecting a routing path amount interior switches connecting between the eNB boundary switch and the boundary router with a least congested route in the backhaul.

17. The method of claim 12, further comprising installing switching rules in a plurality of flow tables.

18. The method of claim 17, wherein installing switching rules in a plurality of flow tables further includes,
   obtaining information relating to policy control and billing policy from policy and charging rules function ("PCRF"), online charging server ("OCS"), and offline charging system ("OFCS"); and
   setting rules to a plurality of routers based on the information.

19. A method for routing network flows, comprising:
   sending a handover request coded in OpenFlow protocol ("OFP") from a source evolved Node B ("eNB") to OpenFlow network controller ("OFNC") situated in a backhaul network requesting a handover to a target eNB;
   forwarding OpenFlow switching rules from the OFNC to the target eNB for setting up a new routing path to one or more interior switches in the backhaul network between the target eNB and a boundary router;
   identifying a target eNB boundary switch which has a direct link to the target eNB and is logically situated at boundary of the backhaul network responsible to communicate with the target eNB; and
   sending a rule modification message formatted in OFP to the target eNB boundary switch for modifying OpenFlow switching rules in the target eNB boundary switch.

20. The method of claim 19, further comprising forwarding a switching message formatted in OFP from OFNC to at least one node for installing switching rules.

* * * * *